US012047031B2

(12) United States Patent
Lubic et al.

(10) Patent No.: US 12,047,031 B2
(45) Date of Patent: Jul. 23, 2024

(54) MOUNT FOR AN ENERGIZER

(71) Applicant: Woodstream Corporation, Lancaster, PA (US)

(72) Inventors: Marko Konstantin Lubic, Shillington, PA (US); Luke Benjamin Haney, Lititz, PA (US); Andrew Joseph Gauker, Mohnton, PA (US)

(73) Assignees: Woodstream Corporation, Lancaster, PA (US); Ares Capital Corporation, New York, NY (US)

( * ) Notice: Subject to any disclaimer, the term of this patent is extended or adjusted under 35 U.S.C. 154(b) by 306 days.

(21) Appl. No.: 17/333,265

(22) Filed: May 28, 2021

(65) Prior Publication Data

US 2021/0376783 A1 Dec. 2, 2021

Related U.S. Application Data

(60) Provisional application No. 63/032,106, filed on May 29, 2020.

(51) Int. Cl.
*H02S 20/30* (2014.01)
*F16M 11/10* (2006.01)
*F16M 11/28* (2006.01)
*F16M 13/02* (2006.01)

(52) U.S. Cl.
CPC ............. *H02S 20/30* (2014.12); *F16M 11/10* (2013.01); *F16M 11/28* (2013.01); *F16M 13/022* (2013.01); *F16M 2200/027* (2013.01)

(58) Field of Classification Search
CPC ....... H02S 20/30; H02S 20/32; F16M 11/041; F16M 11/06; F16M 11/08; F16M 11/10; F16M 11/2007; F16M 11/2014; F16M 11/2021; F16M 13/022; F16M 2200/02; F16M 2200/022; F16M 2200/024
See application file for complete search history.

(56) References Cited

U.S. PATENT DOCUMENTS

| | | | |
|---|---|---|---|
| 9,746,207 B1 * | 8/2017 | Gregory | F24S 30/452 |
| 2010/0326427 A1 * | 12/2010 | Chen | F24S 30/458 |
| | | | 126/607 |
| 2011/0259396 A1 * | 10/2011 | Hoffman | H01L 31/0547 |
| | | | 136/246 |
| 2017/0025986 A1 * | 1/2017 | Almy | F24S 25/634 |
| 2017/0163208 A1 * | 6/2017 | Almy | F24S 30/425 |
| 2021/0001780 A1 * | 1/2021 | Hancock | B60R 11/00 |

FOREIGN PATENT DOCUMENTS

KR 20110050799 A * 5/2011

OTHER PUBLICATIONS

Machine translation of KR20110050799A (Year: 2011).*

* cited by examiner

*Primary Examiner* — Ryan S Cannon
(74) *Attorney, Agent, or Firm* — Barley Snyder

(57) ABSTRACT

A mount for an energizer includes a base body, a pivot element attachable to the energizer, and a pivot assembly connecting the pivot element to the base body. The pivot assembly is movable between a first position and a second position in which the pivot assembly is biased toward the first position. The pivot element is held at a fixed pivot angle by the base body with the pivot assembly in the first position. The pivot element is pivotable with respect to the base body with the pivot assembly in the second position.

20 Claims, 10 Drawing Sheets

MOUNT FOR AN ENERGIZER

CROSS-REFERENCE TO RELATED APPLICATION

This application claims priority under 35 U.S.C. § 119 to U.S. Provisional Patent Application No. 63/032,106, filed May 29, 2020.

FIELD OF THE INVENTION

The present invention relates to a mount and, more particularly, to a mount for an energizer.

BACKGROUND

An energizer, for example an energizer for solar electric generation, is used in many outdoor applications. Many energizers have a mount that holds and positions the electrical generation components of the energizer. A user often needs to re-position the energizer with the mount in order to optimize solar electric generation based on seasonal and geographical factors.

Many energizers are formed integrally with their mounts, which makes movement and positioning of the energizer cumbersome. Further, adjustment of an angle of the energizer often either requires tools or is not robust and does not reliably maintain a set angle.

SUMMARY

A mount for an energizer includes a base body, a pivot element attachable to the energizer, and a pivot assembly connecting the pivot element to the base body. The pivot assembly is movable between a first position and a second position in which the pivot assembly is biased toward the first position. The pivot element is held at a fixed pivot angle by the base body with the pivot assembly in the first position. The pivot element is pivotable with respect to the base body with the pivot assembly in the second position.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
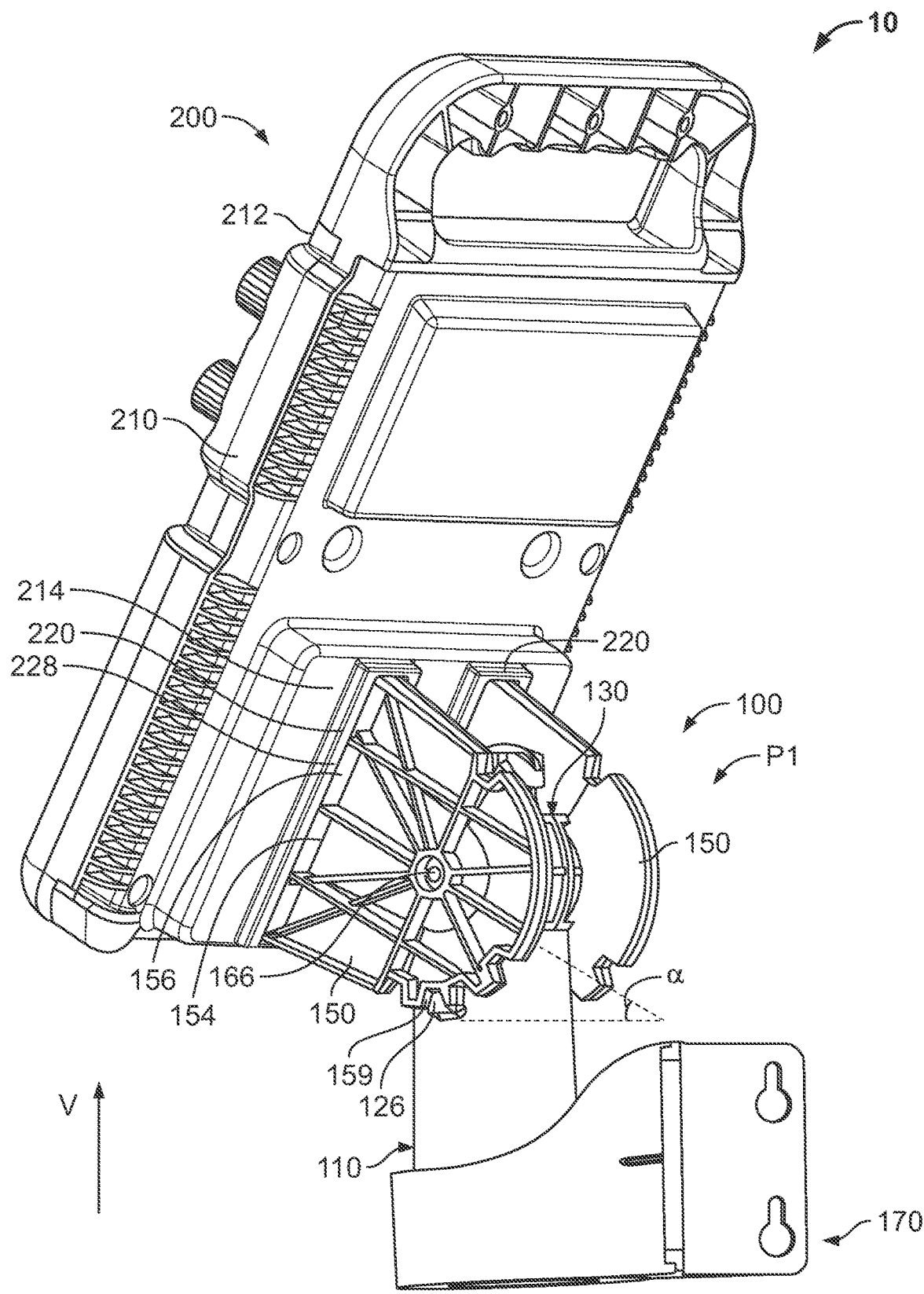
FIG. 1 is a perspective view of an energizer assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept to those skilled in the art.

An energizer assembly 10 according to an embodiment, as shown in FIG. 1, comprises a mount 100 and an energizer 200 removably attachable to the mount 100.

Figure 2:
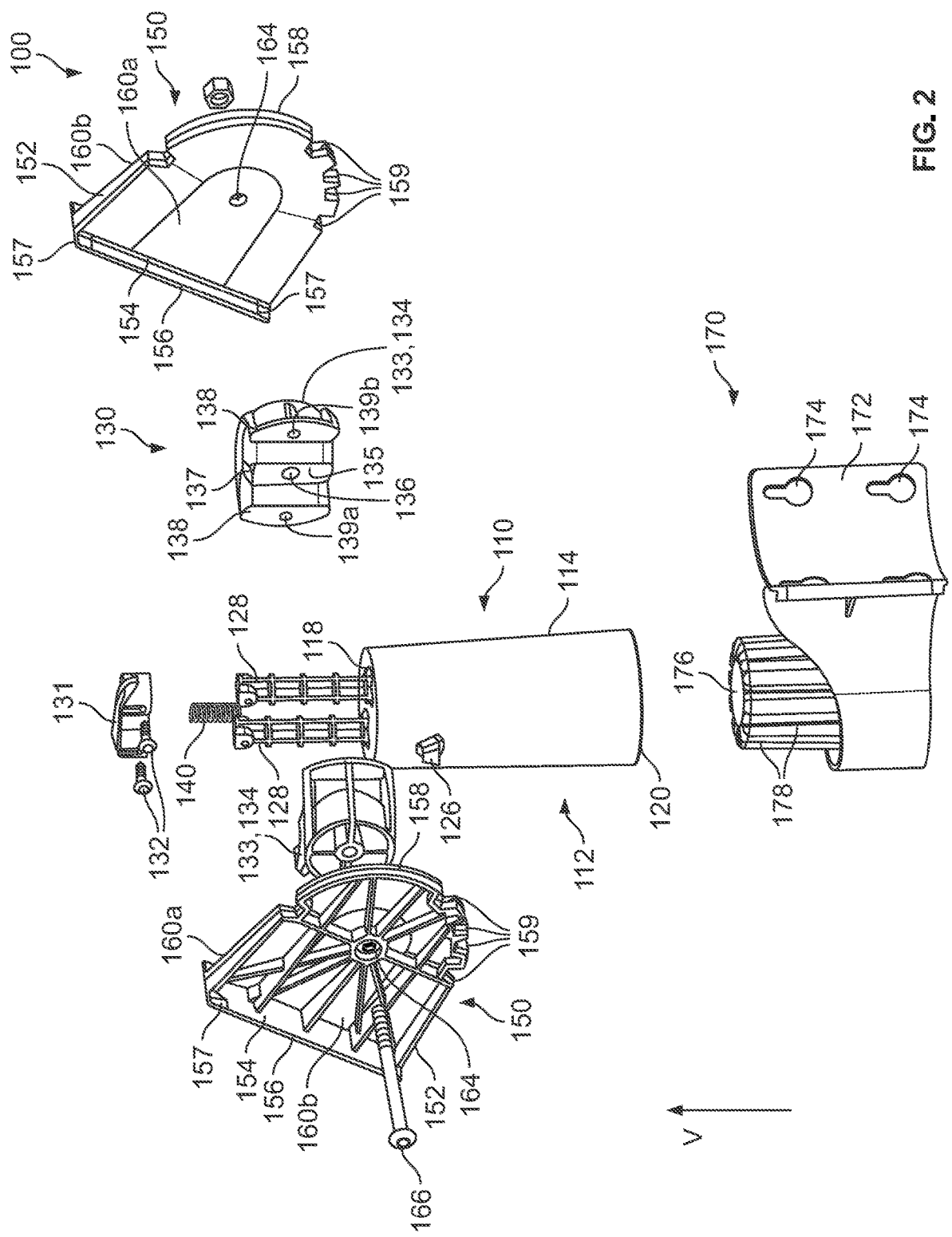
FIG. 2 is an exploded perspective view of a mount of the energizer assembly.

The mount 100, as shown in FIGS. 1 and 2, includes a base body 110, a pivot assembly 130 connected to the base body 110, a pair of pivot elements 150 attached to the pivot assembly 130, and a post adapter 170 connected to the base body 110.

Figure 3:
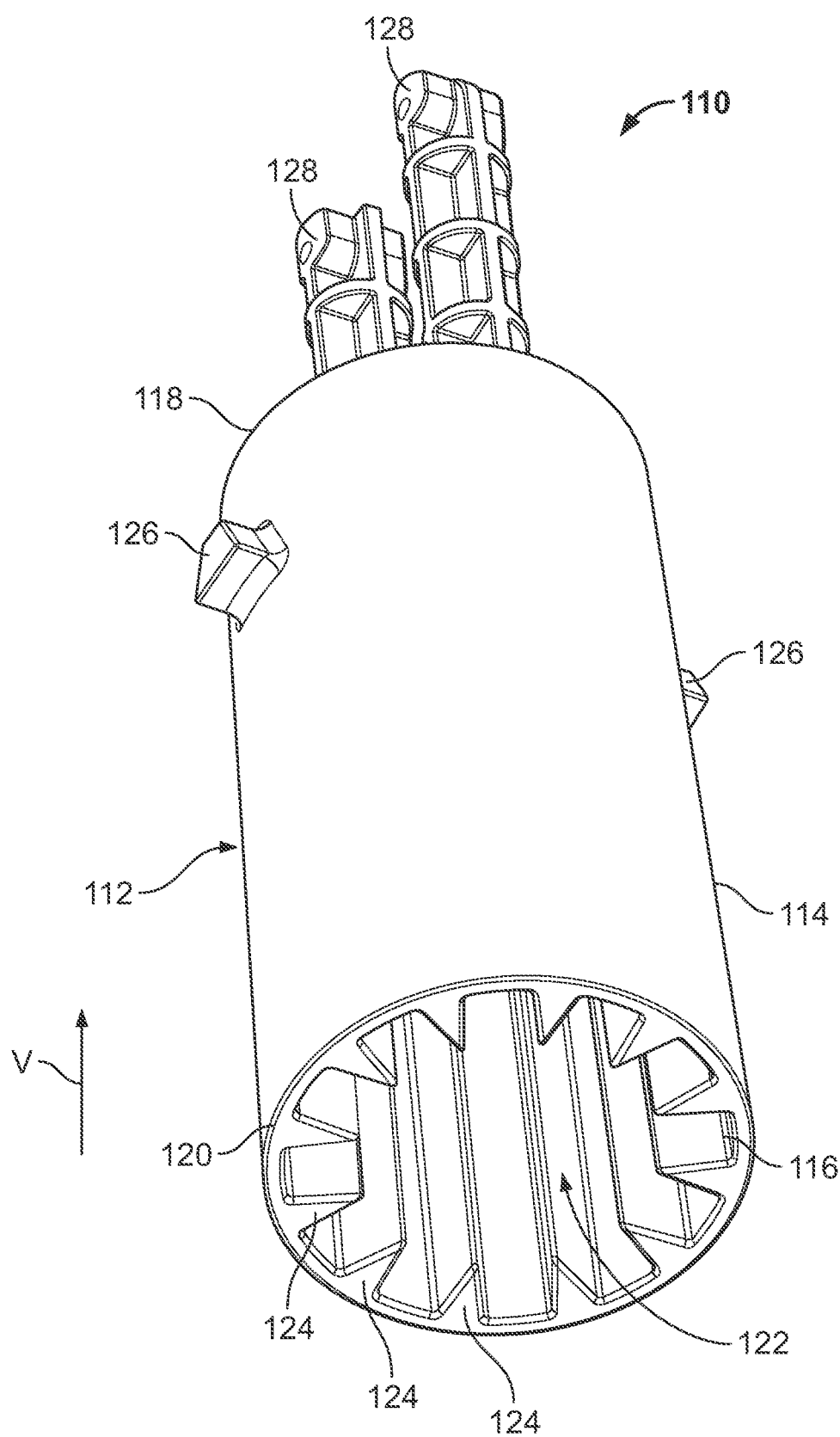
FIG. 3 is a perspective view of a base body of the mount.

The base body 110, as shown in FIGS. 2 and 3, has a mounting element 112 and a pair of columns 128 extending from the mounting element 112. The mounting element 112 is elongated along a vertical direction V and has an outer surface 114, an inner surface 116, a top surface 118, and a bottom surface 120 opposite the top surface 118 in the vertical direction V. The columns 128 extend from the top surface 118 in the vertical direction V and are spaced apart from one another on the top surface 118. In the shown embodiment, the mounting element 112 has a flared cylindrical shape. The mounting element 112 could have other shapes elongated along the vertical direction V in other embodiments.

The base body 110 has a pair of protrusions 126, shown in FIGS. 2 and 3, extending from the outer surface 114 of the mounting element 112 perpendicular to the vertical direction V. In the shown embodiment, the protrusions 126 are symmetrically positioned along the outer surface 114 and each have a trapezoidal shape. In other embodiments, the protrusions 126 may be positioned differently along the outer surface 114 and may have polygonal shapes other than trapezoidal.

As shown in FIG. 3, the mounting element 112 has a mounting passageway 122 extending into the bottom surface 120 in the vertical direction V. The mounting element 112 has a plurality of splines 124 extending into the mounting passageway 122 from the inner surface 116. The splines 124 are distributed evenly around the inner surface 116.

In the embodiment shown in FIGS. 1-3, the base body 110 is monolithically formed in a single piece from a resin material. In an embodiment, the resin material is an acrylonitrile butadiene styrene (ABS) plastic.

The pivot assembly 130, as shown in FIG. 2, includes a fixed retainer 131, a sliding retainer 133 movable with respect to the fixed retainer 131, and a spring 140 disposed between the fixed retainer 131 and the sliding retainer 133. In an embodiment, each of the fixed retainer 131 and the sliding retainer 133 are made of a resin material, such as an ABS plastic. The spring 140 may be any type of elastically compressible spring.

Figure 6:
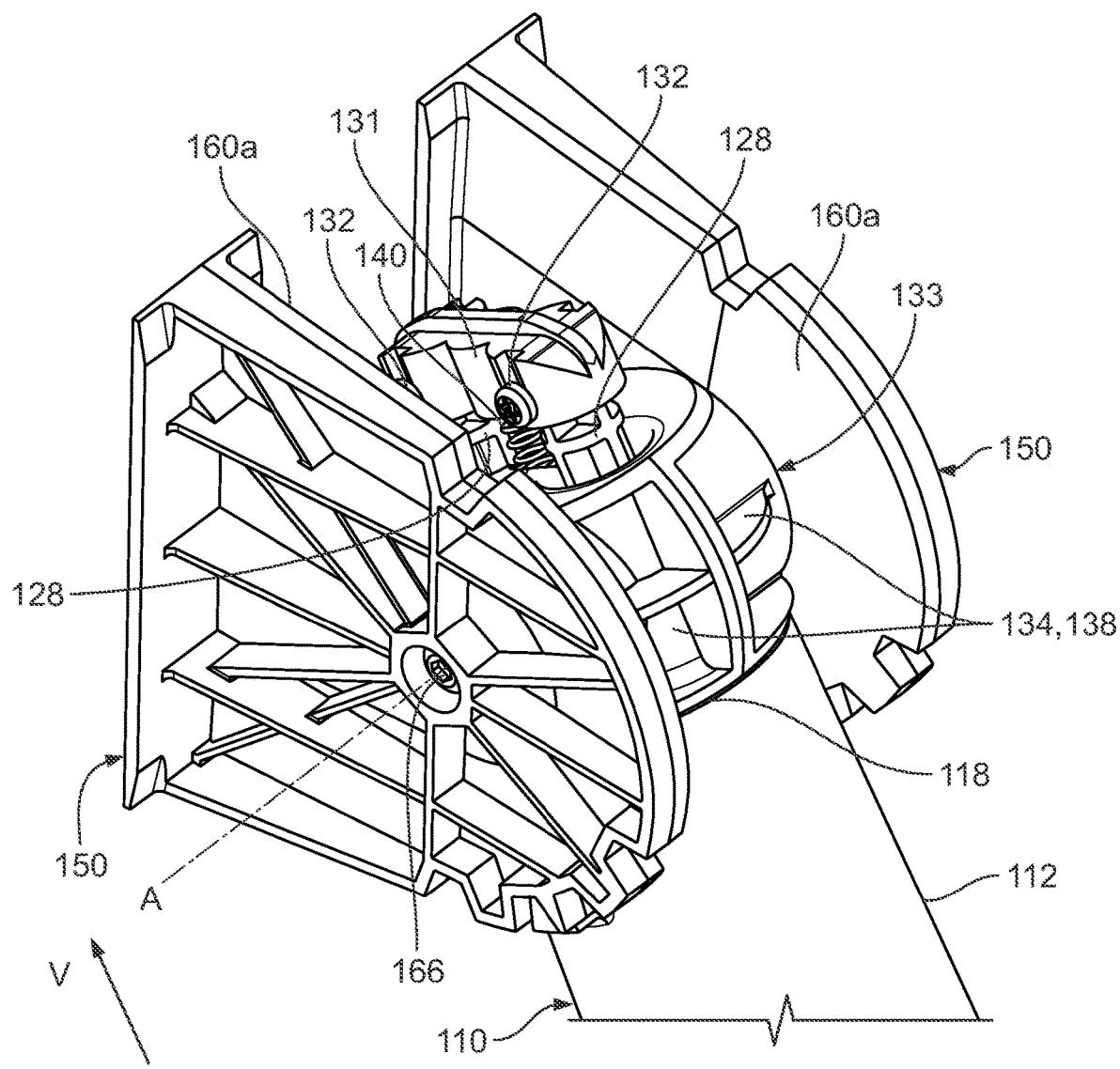
FIG. 6 is a perspective view of a portion of the mount.
Figure 7:
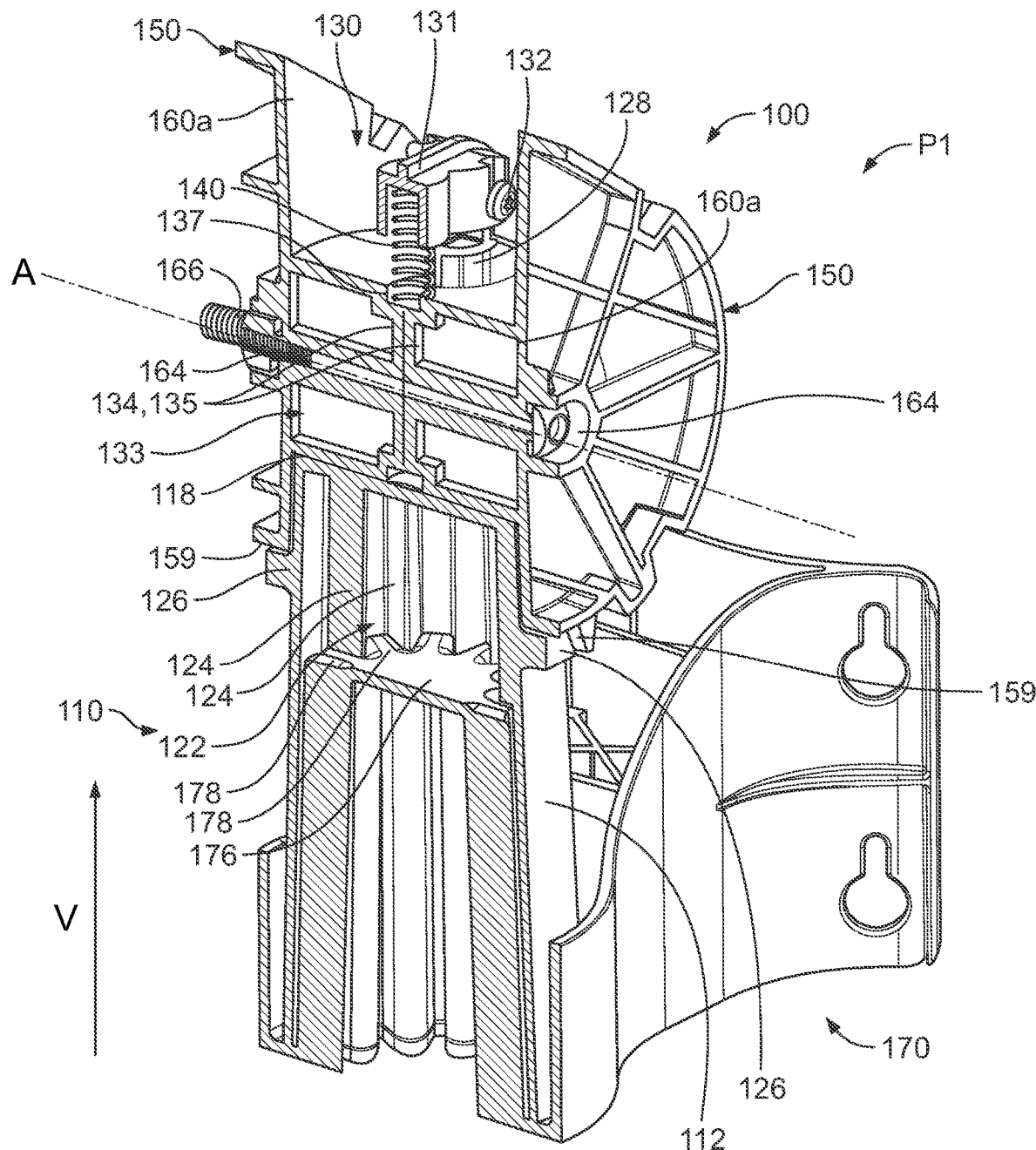
FIG. 7 is a sectional perspective view of the mount with a pivot assembly in a first position.

The sliding retainer 133, as shown in FIGS. 2 and 6, is formed by a pair of halves 134 attached to one another. Each of the halves 134, as shown in FIG. 2, is formed in a curved E-shape with a central leg 135 and a pair of outer legs 138 on opposite sides of the central leg 135. The central leg 135 has a fastener receiving passageway 136 extending through the central leg 135 and a spring seat 137 formed on an end of the central leg 135 in the vertical direction V; the spring seat 137 is also shown in FIG. 7. Each of the outer legs 138 has either a standoff 139a protruding from or a niche 139b extending into a surface of the outer leg 138. Only one of the halves 134 is labeled with reference numbers in FIG. 2 for visibility and drawing clarity, however, the same labels apply to both of the hales 134.

Each of the pivot elements 150, as shown in FIG. 2, has an outer circumferential edge 152 that includes a flat edge 154 and a curved edge 158 extending from opposite ends of the flat edge 154. Each pivot element 150 has a flange 156 extending from the flat edge 154 beyond a pair of opposite sides 160a, 160b of the pivot element 150. The flange 156 has a taper 157 at each of a pair of opposite ends of the flange 156 along the flat edge 154. Each pivot element 150 has a fastener receiving passageway 164 extending approximately centrally through the pivot element 150.

Each pivot element 150, as shown in FIG. 2, has a plurality of recesses 159 on the outer circumferential edge 152 that extend into the curved edge 158. In the shown embodiment, the recesses 159 have an approximately trapezoidal shape. In other embodiments, each of the recesses 159 could have any shape complementary to the shape of the protrusions 126. The recesses 159 are spaced at predetermined intervals along the curved edge 158. The recesses 159 may be evenly spaced along the curved edge 158 or, in other embodiments, may be unevenly spaced along the curved edge 158 according to the application.

In the embodiment shown in FIG. 2, an interior side 160a of each of the pivot elements 150 facing the pivot assembly 130 is smooth and an exterior side 160b of each of the pivot elements 150 facing away from the pivot assembly 130 is structured. In another embodiment, shown in FIG. 4, the exterior side 160b of the pivot element 150 is smooth and has a plurality of recess labels 162 each corresponding to one of the recesses 159. Otherwise, in the embodiment shown in FIG. 4, like reference numbers refer to like elements in comparison with the pivot elements 150 shown in FIG. 2.

Figure 4:
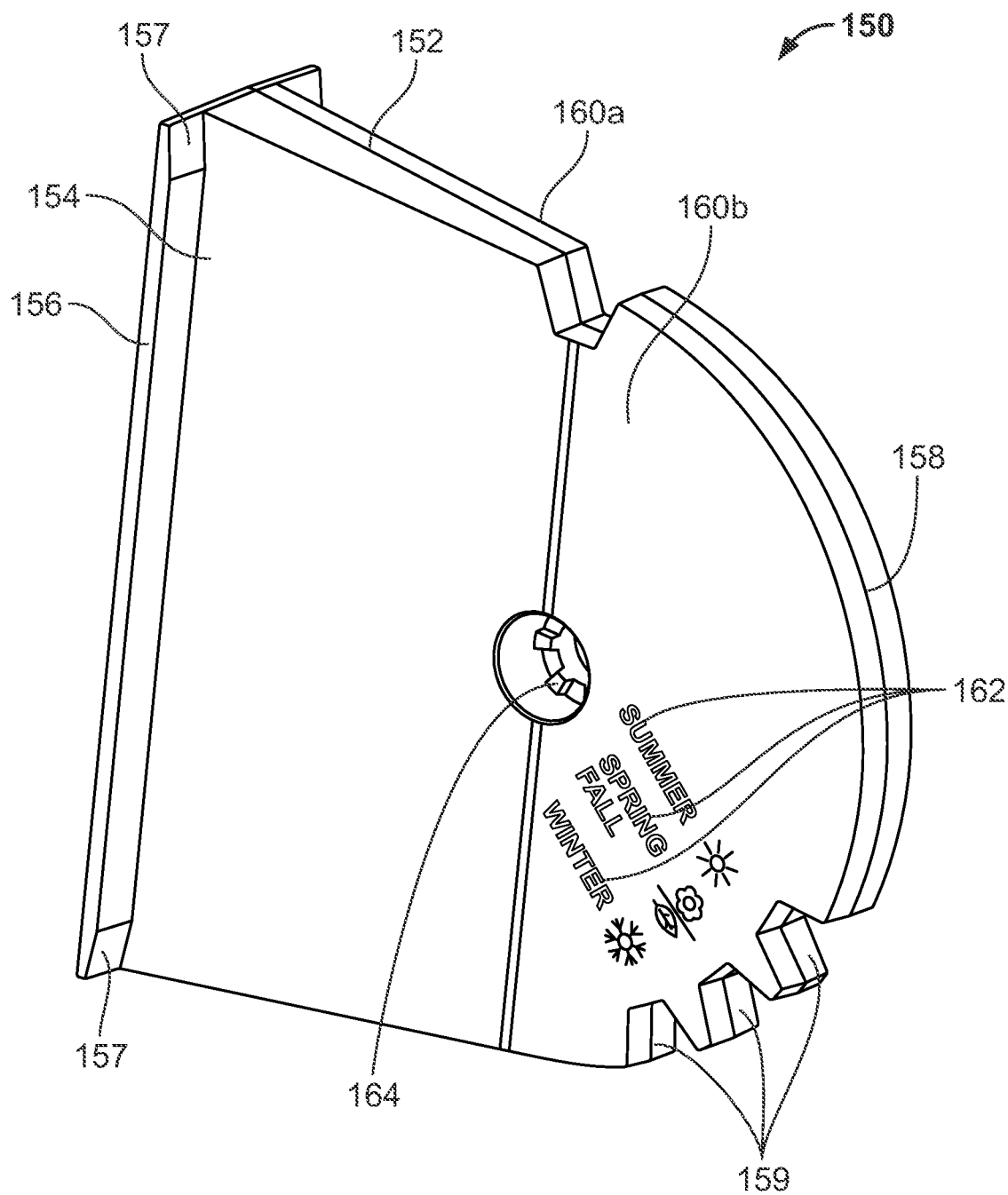
FIG. 4 is a perspective view of a pivot element of the mount according to an embodiment.

In the embodiment shown in FIGS. 1, 2, and 4, each of the pivot elements 150 is monolithically formed in a single piece from a resin material. In an embodiment, the resin material is the ABS plastic.

Figure 5:
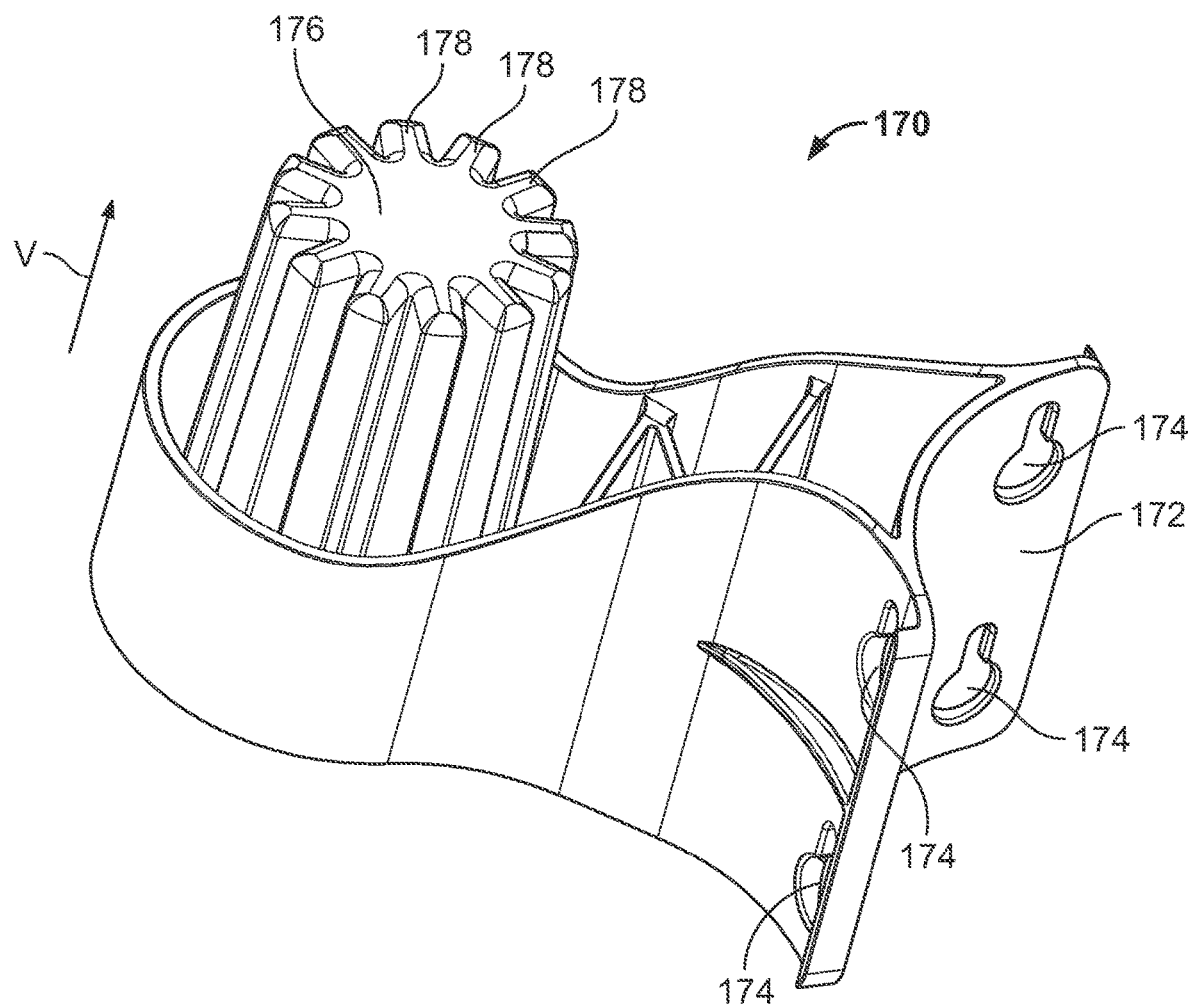
FIG. 5 is a perspective view of a post adapter of the mount.

The post adapter 170, shown in FIGS. 2 and 5, has an adapter flange 172 and a shaft 176 connected to the adapter flange 172. The adapter flange 172 extends in the vertical direction V and has a plurality of securing openings 174 extending through the adapter flange 172. In the shown embodiment, each of the securing openings 174 is a keyhole slot. In other embodiments, the securing openings 174 may be any type of opening capable of receiving a fastener. In the shown embodiment, the adapter flange 172 has a curved profile. In other embodiments, the adapter flange 172 may have a flat profile. The shaft 176 extends in the vertical direction V parallel to the adapter flange 172 and has a plurality of ridges 178 distributed evenly around the shaft 176. The post adapter 170, in an embodiment, is monolithically formed in a single piece from a resin material, such as ABS plastic.

In the exemplary embodiment of the mount 100 shown in FIGS. 1-5 and described above, the mount 100 has particular quantities of various elements, for example, a pair of protrusions 126 and a pair of pivot elements 150. In other embodiments, the quantities of the various components of the mount 100 can vary from those shown in the exemplary embodiment.

The assembly of the mount 100 will now be described in detail primarily with reference to FIGS. 2, 6, and 7.

The pivot assembly 130 is connected to the base body 110 as shown in FIGS. 2, 6, and 7. With the halves 134 of the sliding retainer 133 positioned on opposite sides of the columns 128, as shown in FIG. 2, the halves 134 are brought together with the central leg 135 of each of the halves 134 disposed between the columns 128 and the outer legs 138 disposed around an outside of each of the columns 128, as shown in FIGS. 6 and 7. As the halves 134 are brought together to form the sliding retainer 133, the standoff 139a of one of the halves 134 engages the niche 139b of the other of the halves 134 to ensure proper alignment. The halves 134 are attached to one another around the pair of columns 128. The sliding retainer 133 is initially positioned on the top surface 118 of the mounting element 112 but is movable along the pair of columns 128 in the vertical direction V.

The fixed retainer 131, as shown in FIGS. 2, 6, and 7, is fixed to an end of each of the columns 128 opposite the mounting element 112 by a plurality of retainer fasteners 132. The spring 140 is disposed between the fixed retainer 131 and the sliding retainer 133 and extends in the vertical direction V. As shown in FIG. 7, a first end of the spring 140 is held in the fixed retainer 131 and a second end of the spring 140 opposite the first end abuts and is held in the spring seat 137 of the sliding retainer 133. The spring 140 is positioned between the columns 128.

The pivot elements 150 are attached to the pivot assembly 130 as shown in FIGS. 2, 6, and 7. The pivot assembly 130 connects the pivot elements 150 to the base body 110. Each of the pivot elements 150 is positioned with the interior side 160a abutting one of the halves 134 of the sliding retainer 133. A pivot fastener 166 extends through the fastener receiving passageway 164 of each of the pivot elements 150 and the fastener receiving passageway 136 of each of the halves 134, attaching the pivot elements 150 to the sliding retainer 133. The pivot elements 150 are pivotable together with respect to the sliding retainer 133 and the base body 110 about a pivot axis A extending through the pivot fastener 166; the pivot axis A is perpendicular to the vertical direction V. The pivot elements 150 are movable with the sliding retainer 133 along the columns 128 in the vertical direction V.

The base body 110, with the pivot assembly 130 and pivot elements 150 attached to the base body 110 as described above, is positionable on the post adapter 170 as shown in FIGS. 1, 3, 5, and 7. The shaft 176 of the post adapter 170 is removably insertable into the mounting passageway 122. When the shaft 176 is inserted, as shown in FIG. 7, the ridges 178 are positioned between the splines 124 and engage the splines 124, securing the mounting element 112 to the post adapter 170.

Figure 9:
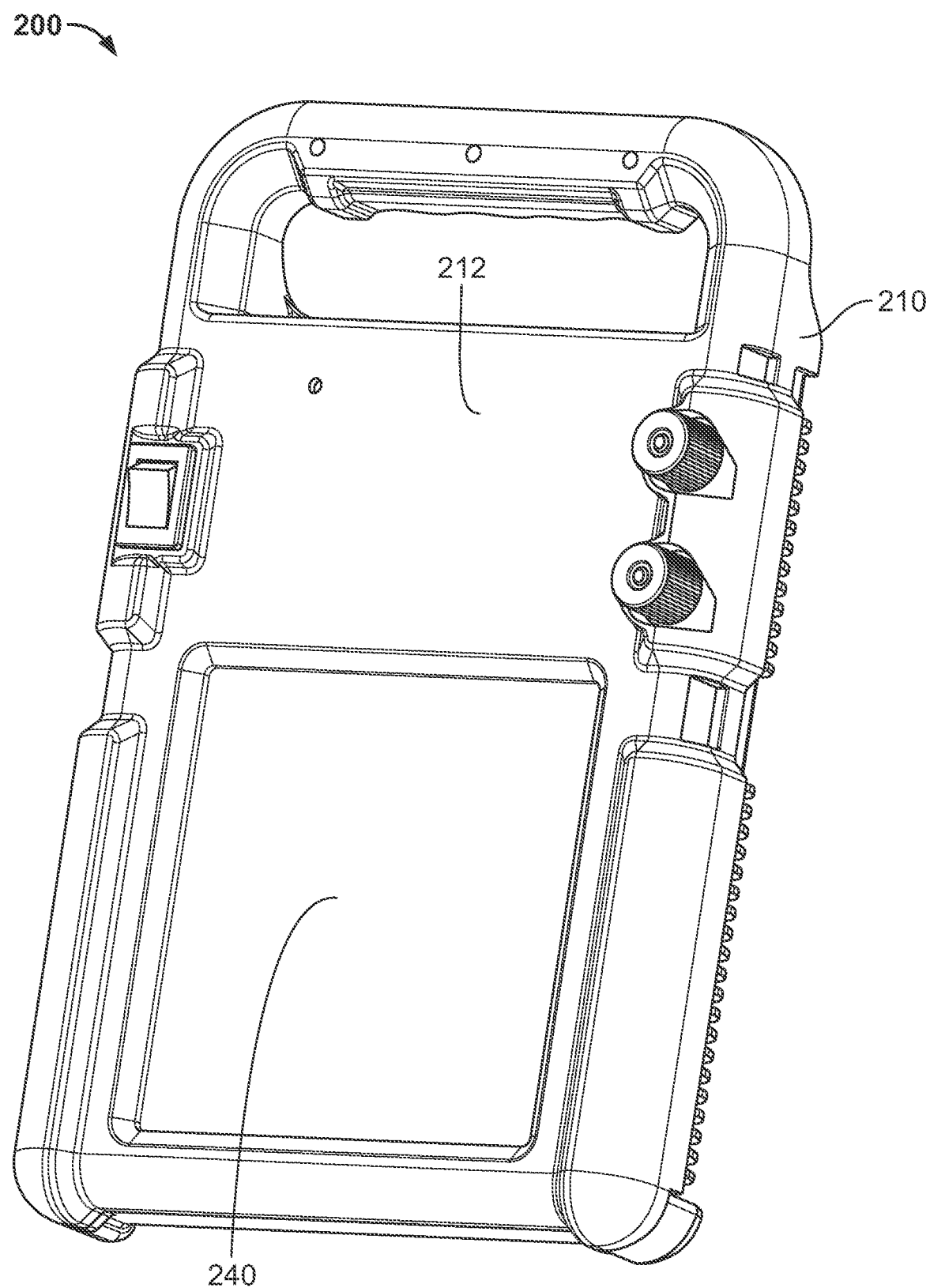
FIG. 9 is a front perspective view of an energizer of the energizer assembly.
Figure 10:
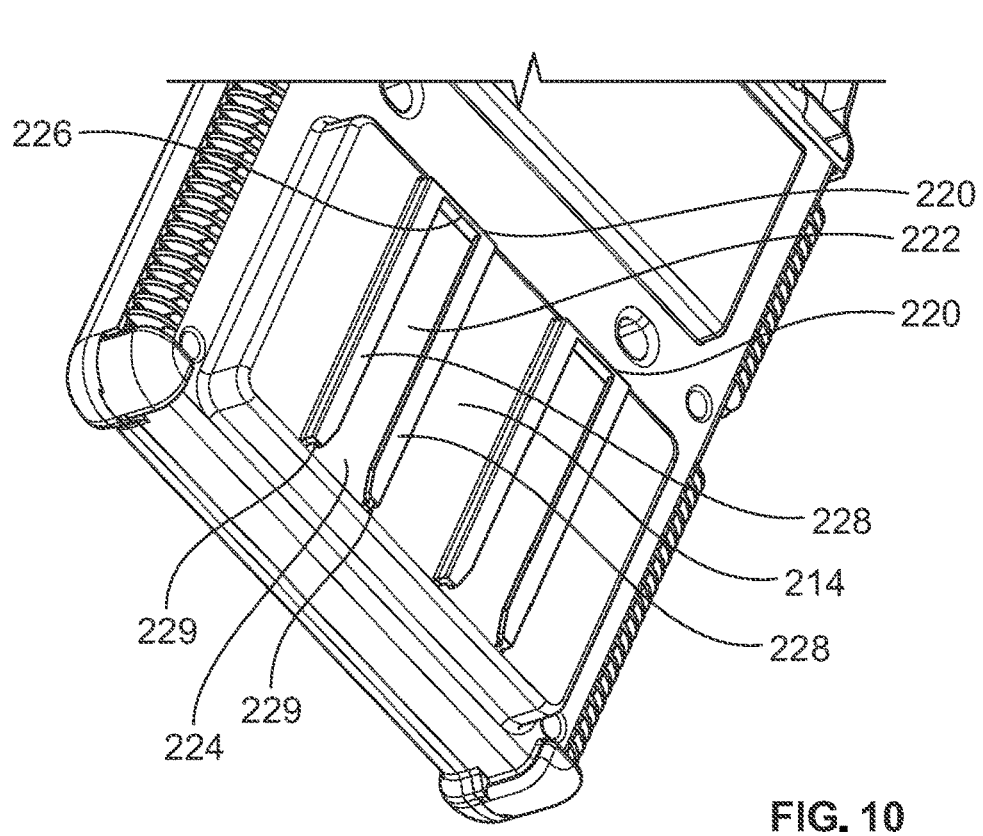
FIG. 10 is a rear perspective view of a portion of the energizer of FIG. 9.

The energizer 200 of the energizer assembly 10, as shown in FIGS. 1, 9, and 10, includes a housing 210 with a front surface 212 and a back surface 214 opposite the front surface 212. A pair of tracks 220 are formed on the housing 210 and disposed on the back surface 214. In the embodiment shown in FIG. 9, the energizer 200 is a solar energizer and has a solar panel 240 on the front surface 212.

Each of the tracks 220, as shown in FIG. 10, has a track passageway 222 extending from an open end 224 to a stop 226 and a pair of lips 228 extending from opposite sides of the track passageway 222. The lips 228 extend over a portion of the track passageway 222 from each side of the track passageway 222. In the shown embodiment, each of the lips 228 has a chamfer 229 at the open end 224. Only one of the tracks 220 is labeled with reference numbers in FIG. 10 for clarity of the drawing, but the reference labels and description apply equally to both tracks 220.

In the embodiment shown in FIGS. 1 and 10, the tracks 220 disposed on the back surface 214 extend over and are positioned over the back surface 214. The lips 228 extend from the back surface 214 and the track passageway 222 extends over the back surface 214. In another embodiment shown in FIG. 11, the tracks 220 disposed on the back surface 214 are positioned within the back surface 214. The lips 228 are formed by the back surface 214 and the track passageway 222 extends within the back surface 214. Only one of the tracks 220 is labeled with reference numbers in FIG. 11 for clarity of the drawing, but the reference labels and description apply equally to both tracks 220.

Figure 11:
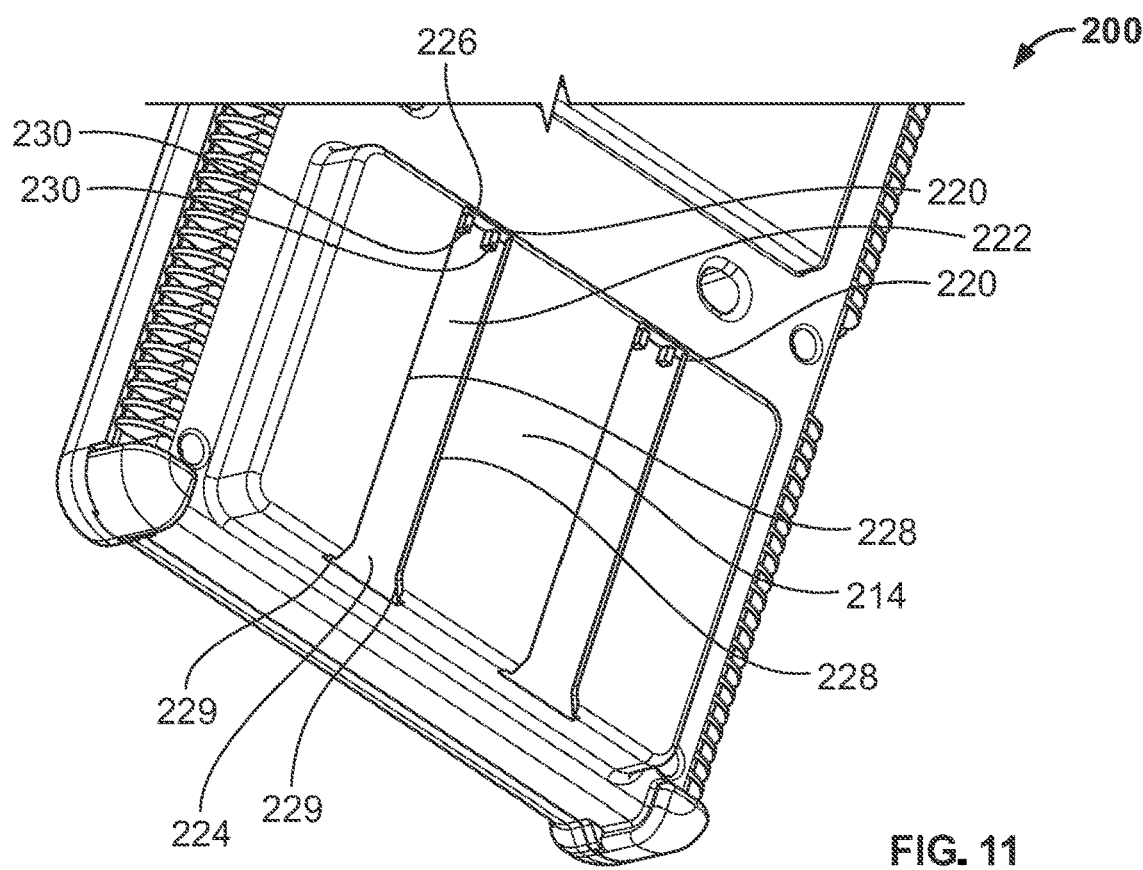
FIG. 11 is a rear perspective view of a portion of an energizer according to another embodiment.

In the embodiment shown in FIG. 11, the tracks 220 each have a plurality of interference pegs 230 extending into the track passageway 222 adjacent the stop 226. The interference pegs 230 could apply equally to the embodiment of the tracks 220 shown in FIG. 10.

As shown in FIGS. 1, 2, 10, and 11, the mount 100 is attached to the energizer 200 to form the energizer assembly 10. Each of the pivot elements 150 is slidably and removably engageable with one of the tracks 220 of the housing 210 to secure the energizer 200 to the mount 100. The flat edge 154 of each of the pivot elements 150 is inserted into the track passageway 222 of one of the tracks 220. The flange 156 engages the lips 228 to secure the pivot element 150 to the housing 210. The taper 157 and the chamfer 229 both aid in positioning the flange 156 in the track passageway 222 at the open end 224 and the interference pegs 230 engage the taper 157 when fully inserted to further secure the flat edge 154 in the track 220. Both insertion of the flat edge 154 into the track 220 and removal of the flat edge 154 from the track 220 can be performed by sliding the housing 210 and the pivot elements 150 in relation to each other, allowing engagement and disengagement of the energizer 200 and the mount 100 to be performed without additional tools.

Figure 8:
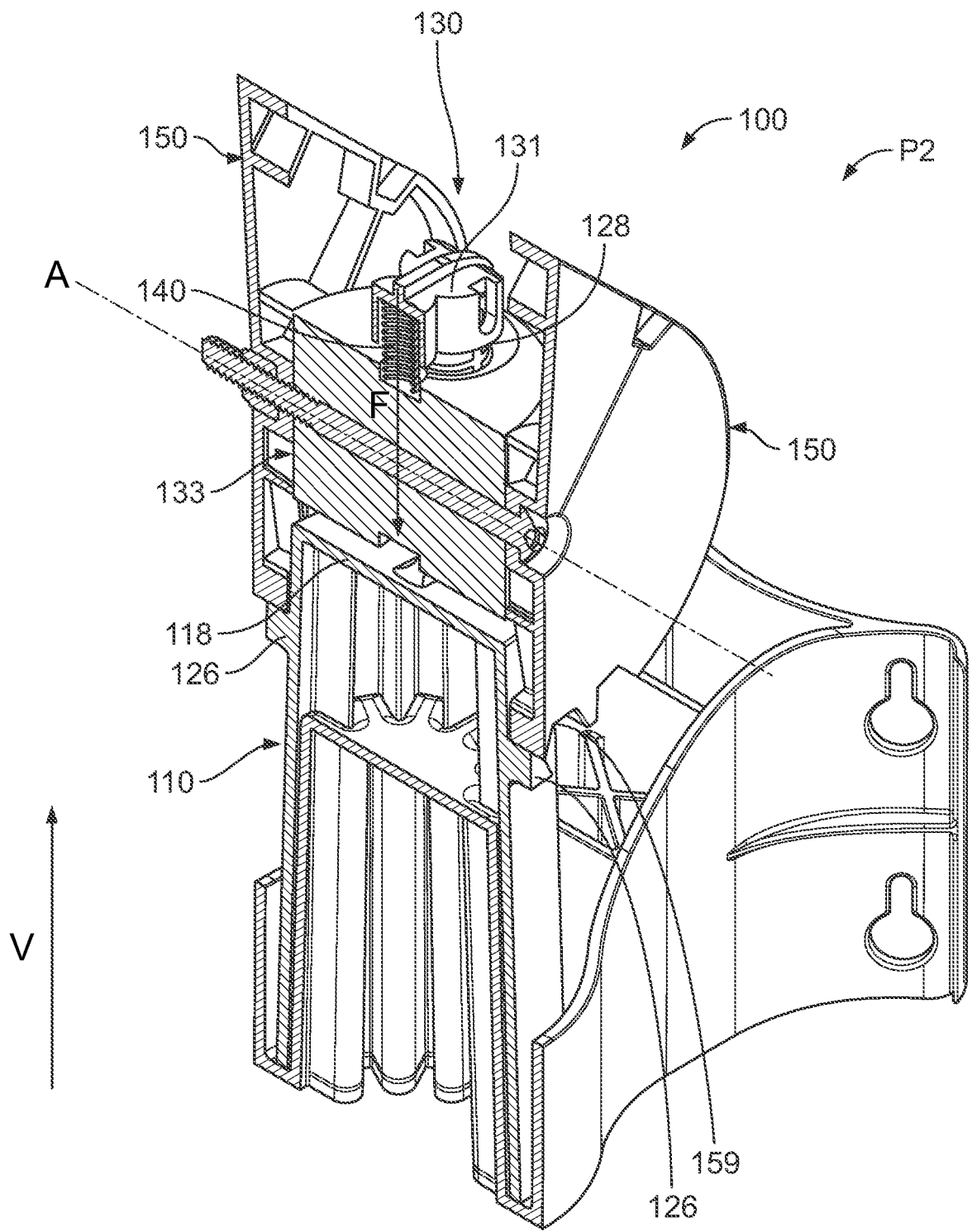
FIG. 8 is a sectional perspective view of the mount with the pivot assembly in a second position.

The pivot assembly 130 is movable along the vertical direction V between a first position P1, shown in FIGS. 1 and 7, and a second position P2, shown in FIG. 8.

In the first position P1, shown in FIGS. 1 and 7, the sliding retainer 133 is positioned on the top surface 118 of the mounting element 112. The spring 140 is extended and is not compressed between the fixed retainer 131 and the sliding retainer 133. Each of the protrusions 126 of the base body 110 is engaged in one of the recesses 159 of one of the pivot elements 150. The engagement of the protrusion 126 in one of the recesses 159 holds the pivot element 150 at a fixed pivot angle α about the pivot axis A defined by the pivot fastener 166, holding the energizer 200 at the fixed pivot angle α.

The movement of the pivot assembly 130 between the first position P1 and the second position P2 permits a change of the fixed pivot angle α about the pivot axis A. To change the fixed pivot angle α, a user pulls the base body 110 and the pivot elements 150 away from each other in the vertical direction V. As shown in the transition from the first position P1 in FIG. 7 to the second position P2 in FIG. 8, the pivot elements 150 move away from the base body 110, the sliding retainer 133 moves along the columns 128 away from the top surface 118 and toward the fixed retainer 131, and the spring 140 is compressed in the vertical direction V between the sliding retainer 133 and the fixed retainer 131. The compressed spring 140 applies a spring force F on the sliding retainer 133 in the second position P2, biasing the sliding retainer 133 and the pivot assembly 130 toward the first position P1.

In the second position P2, each of the protrusions 126 disengages from the recess 159 of one of the pivot elements 150 and is spaced apart from the recesses 159 in the vertical direction V, as shown in FIG. 8. The pivot elements 150 are then pivotable with respect to the base body 110 about the pivot axis A with the pivot assembly 130 in the second position P2; the user can pivot the pivot elements 150 and the attached energizer 200 to the desired angle in the second position P2. The base body 110 is then moved back toward the pivot elements 150 in the vertical direction V or released, and the spring 140 urges the pivot assembly 130 back to the first position P1.

In the first position P1, as shown in FIG. 7, each of the protrusions 126 of the base body 110 re-engage in one of the recesses 159 of one of the pivot elements 150, holding the pivot elements 150 at a fixed pivot angle α selected by the pivoting in the second position P2. Each of the recesses 159 corresponds to a different fixed pivot angle α of the pivot elements 150 about the pivot axis A. The movement of the pivot assembly 130 between the first position P1 and the second position P2 holds the pivot elements 150 and the attached energizer 200 at a fixed pivot angle α, while allowing the user to quickly and easily select and change the fixed pivot angle α from a plurality of different fixed pivot angles α without requiring tools. In the shown embodiment, the ease of changing the fixed pivot angle α allows the user to easily adjust the energizer assembly 10 to have the optimal fixed pivot angle α for solar electric generation at the solar panel 240.

The post adapter 170 permits attachment of the energizer assembly 10 to a vertical post; the adapter flange 172 is positioned to abut the vertical post and a plurality of fasteners extend through the securing openings 174 to secure the adapter flange 172 to the vertical post. The vertical post in this embodiment can be a round wooden post or can be any other type of post to which the adapter flange 172 can be attached. In an alternative embodiment, the post adapter 170 is omitted from the mount 100 and the mounting element 112 is positioned directly on top of the vertical post. In this embodiment, the vertical post engages the splines 124 to hold the mounting element 112 in position. The vertical post in this alternative embodiment can be a metal T-post or any other type of post with cross-sectional edges capable of engaging the splines 124.

While the fixed pivot angle α is held or permitted to be adjusted by movement of the pivot assembly 130 between the first position P1 and the second position P2, an angle of rotation of the mounting element 112 with respect to the post adapter 170 about the vertical direction V can also be changed. A user can lift the mounting element 112 in the vertical direction V off of the shaft 176, as shown in FIG. 2, and can re-insert the shaft 176 into the mounting passageway 122 in another position rotated about the vertical direction V. The splines 124 and ridges 178 can engage one another in each of a plurality of different rotational positions of the base body 110 with respect to the post adapter 170 about the vertical direction V. Likewise, in the alternative embodiment in which the mounting element 112 is positioned directly on top of the vertical post, the mounting element 112 can be rotated to the one of a plurality of different rotational positions about the vertical direction V with respect to the vertical post.

What is claimed is:

1. A mount for an energizer, comprising:
a base body including a pair of columns extending from a mounting element;
a pivot element attachable to the energizer; and
a pivot assembly connecting the pivot element to the base body, including:

a fixed retainer fixed to an end of each of the pair of columns opposite the mounting element; and a sliding retainer movable with respect to the fixed retainer and slidable along the pair of columns, the pivot assembly is movable between a first position and a second position in which the pivot assembly is biased toward the first position, the pivot element is held at a fixed pivot angle by the base body with the pivot assembly in the first position, the pivot element is pivotable with respect to the base body with the pivot assembly in the second position.

2. The mount of claim 1, wherein the base body has a mounting element with a protrusion on an outer surface of the mounting element.

3. The mount of claim 2, wherein the pivot element has a plurality of recesses on an outer circumferential edge of the pivot element.

4. The mount of claim 3, wherein the outer circumferential edge of the pivot element has a flat edge and a curved edge, the plurality of recesses extend into the curved edge.

5. The mount of claim 3, wherein the protrusion engages one of the plurality of recesses in the first position and is spaced apart from the plurality of recesses in the second position.

6. The mount of claim 5, wherein each of the plurality of recesses corresponds to a different fixed pivot angle of the pivot element.

7. The mount of claim 1, wherein the pivot assembly is movable between the first position and the second position along a vertical direction and the pivot element is pivotable with respect to the base body about a pivot axis perpendicular to the vertical direction.

8. The mount of claim 1, wherein the pivot assembly further includes a spring disposed between the fixed retainer and the sliding retainer.

9. The mount of claim 8, wherein the spring is compressed between the fixed retainer and the sliding retainer in the second position.

10. The mount of claim 1, wherein the pivot element has a pivot fastener attaching the pivot element to the sliding retainer, the pivot element is pivotable about the pivot fastener and movable with the sliding retainer along the pair of columns.

11. The mount of claim 1, wherein the sliding retainer includes a pair of halves attached to one another around the pair of columns.

12. A mount for an energizer, comprising:
a base body having a mounting element with a mounting passageway extending into a bottom surface of the mounting element in a vertical direction and along a central axis of the mounting element and the base body, and a plurality of splines extending into the mounting passageway from an inner surface of the mounting element, the base body elongated in the vertical direction and along the central axis;

a post adapter having a shaft with a plurality of ridges distributed around the shaft, the post adapter is removably insertable into the mounting passageway in a plurality of different rotational positions of the base body with respect to the post adapter about the vertical direction, the ridges engaging the splines and securing the base body in each of the different rotational positions; and a pivot assembly arranged at a top of the base body and opposite the post adapter in the vertical direction, the pivot assembly defining a pivot axis extending normal to the central axis.

13. The mount of claim 12, wherein the post adapter has an adaptor flange connected to the shaft and a plurality of securing openings extending through the adaptor flange.

14. The mount of claim 13, wherein the adaptor flange extends in the vertical direction.

15. The mount of claim 12, wherein the mounting element defines a locking feature formed thereon and adapted to selectively fix the energizer in a plurality of radial positions about the pivot axis.

16. The mount of claim 15, further comprising:
an energizer having a housing and a track formed on the housing; and a pivot element rotatable about the pivot axis and selectively engaging with the locking feature, the pivot element having a flange slidably and removably engageable with the track to secure the energizer to the pivot element, the pivot assembly connecting the pivot element to the base body and including a sliding retainer movable in the vertical direction with respect to the mounting element, wherein motion of the sliding retainer in the vertical direction disengages the pivot element from the locking feature and enables the rotation of the pivot element about the pivot axis.

17. An energizer assembly, comprising:
an energizer having a housing and a track formed on the housing, the track defining a track passageway extending in a linear first direction and having a pair of lips elongated in the first direction and protruding from opposite sides of the track passageway in opposing second directions normal to the first direction and over a portion of the track passageway; and a mount having a base body, a pivot element, and a pivot assembly connecting the pivot element to the base body, the pivot element having:
a flange protruding from an end thereof in the at least one of the second directions, the flange is elongated in the first direction and slidably and removably engageable with the track in the first direction to secure the energizer to the mount; and an edge, the flange extending from each of two sides of the edge in respective ones of the second directions, the flange engages the lips when the edge is inserted into the track passageway in the first direction, the edge extending in the first direction between the pair of lips as the pivot element is slidably engaged with the track.

18. The energizer assembly of claim 17, wherein the track passageway extends from an open end to a stop.

19. The energizer assembly of claim 17, wherein
the edge is flat on at least one side thereof, the at least one flat side of the edge extending in the first direction.

20. The energizer assembly of claim 17, wherein the housing has a back surface and a front surface, the track is disposed on the back surface and the energizer has a solar panel disposed on the front surface.

* * * * *